United States Patent [19]
Mino et al.

[11] Patent Number: 4,731,677
[45] Date of Patent: Mar. 15, 1988

[54] INTEGRATED VIDEO CAMERA/RECORDER UNIT

[75] Inventors: Mineo Mino, Hirakata; Yoshikazu Kageyama, Neyagawa; Yoshihiro Asahi, Osaka, all of Japan

[73] Assignee: Matsushita Electric Industrial Co., Ltd., Kadoma, Japan

[21] Appl. No.: 810,695

[22] Filed: Dec. 18, 1985

[30] Foreign Application Priority Data

Dec. 24, 1984 [JP] Japan ................................ 59-277150

[51] Int. Cl.⁴ ........................ H04N 5/78; G03B 1/60; G03B 17/18
[52] U.S. Cl. .................................... 360/33.1; 360/60; 360/69; 358/906; 352/171; 354/465
[58] Field of Search .................... 360/31, 33.1, 60, 69; 358/906, 224; 354/465, 414, 475; 352/171

[56] References Cited

U.S. PATENT DOCUMENTS

| | | | |
|---|---|---|---|
| 3,588,375 | 6/1971 | Martin | 360/69 |
| 3,997,916 | 12/1976 | Staar | 360/60 |
| 4,340,095 | 7/1982 | Motoyama et al. | 360/31 X |
| 4,541,010 | 9/1985 | Alston | 358/906 X |
| 4,570,188 | 2/1986 | Ichiyanagi | 360/31 X |

FOREIGN PATENT DOCUMENTS 54-140515 10/1979 Japan ....................................... 360/60

*Primary Examiner*—Aristotelis M. Psitos
*Attorney, Agent, or Firm*—Wenderoth, Lind & Ponack

[57] ABSTRACT

A video tape recorder (VTR) including a detection switch for detecting presence and absence of an erasure prevention tab of a video tape cassette, a light emitting element, a control device associated operatively with the light emitting element, and an electronic viewfinder. When a first video tape cassette provided with the erasure prevention tab as been loaded into the VTR, the control device sets the VTR to a recording standby state and turns on the light emitting element. Meanwhile, when a second video tape cassette which is not provided with the erasure prevention tab has been loaded into the VTR, the control device sets the VTR to a stop state, flashes the light emitting element and causes the electronic viewfinder to display on a screen of the electronic viewfinder a warning indicative of loading of the second video tape cassette into the VTR.

4 Claims, 5 Drawing Figures

INTEGRATED VIDEO CAMERA/RECORDER UNIT

BACKGROUND OF THE INVENTION

The present invention generally relates to video tape recorders and more particularly, to a portable integrated video camera/recorder unit in which a video camera for converting an image of an object into video signals and a cassette type video tape recorder for recording onto a magnetic tape of a video tape cassette the video signals delivered from the video camera are integrally combined with each other.

In commercially available prerecorded video tape cassettes, it is usually so arranged that an erasure prevention tab 2 of a video tape cassette 1 of FIG. 1 is preliminarily snapped off so as to prevent erroneous erasure of the video signals from the magnetic tape or erroneous recording of the video signals onto the magnetic tape. Meanwhile, in addition to the commercially available prerecorded video tape cassettes, such a case may happen that the user snaps off the erasure prevention tab also in the case where he does not want to erroneously erase from the magnetic tape, contents recorded for his private use onto the magnetic tape. In the case where such video tape cassette whose erasure prevention tab 2 has been removed therefrom is loaded into the video tape recorder (hereinbelow, referred to as a "VTR"), absence of the erasure prevention tab 2 is detected by a detection means incorporated in the VTR such that recording of the video signals onto the magnetic tape cannot be performed.

Meanwhile, in the case where the video tape cassette has the erasure prevention tab 2 as shown in FIG. 1, presence of the erasure prevention tab 2 is detected by the detection means such that the video signals can be freely recorded onto or erased from the magnetic tape.

Conventionally, in VTRs, it has been generally so arranged that since it is not so necessary to directly convey information regarding presence and absence of the erasure prevention tab to the users, the VTRs do not have a function of displaying whether or not the loaded video tape cassette has the erasure prevention tab 2. However, in the VTRs, the information regarding presence and absence of the erasure prevention tab 2 is vital for the operational efficiency. Namely, since the VTRs are required to be operated efficiently, it is desirable that recording of the video signals onto the magnetic tape can be started immediately upon loading of the video tape cassette into the VTRs. To this end, when the video tape cassette having the erasure prevention tab, i.e., the video tape cassette enabling recording of the video signals onto the magnetic tape has been loaded into the VTR, a recording standby state is established such that recording of the video signals onto the magnetic tape can be started if a decision has been made as to the image of the object to be recorded.

Furthermore, if it is so arranged that recording of the video signals onto the magnetic tape can be started or temporarily stopped by a single push button, it becomes possible to start or temporarily stop recording of the video signals onto the magnetic tape upon loading of the video tape cassette into the VTR by merely depressing the above described push button, thereby resulting in improvement of the operational efficiency.

SUMMARY OF THE INVENTION

Accordingly, an essential object of the present invention is to provide a VTR in which when a video tape cassette loaded into the VTR is provided with an erasure prevention tab and is not provided with the erasure prevention tab as in the case of a commercially available prerecorded video tape, the VTR is automatically set to a recording standby state and playback of the VTR can be performed immediately, respectively.

Another important object of the present invention is to provide a VTR of the above described type in which changeover between a recording mode and a playback mode can be effected rapidly.

In order to accomplish these objects of the present invention, a video tape recorder embodying the present invention comprises: a detection means for detecting presence and absence of an erasure prevention tab of a video tape cassette loaded into said video tape recorder; a display light emitting element; and a control means which is operatively associated with said detection means; said control means, when a first video tape cassette which is provided with said erasure prevention tab has been loaded into said video tape recorder, setting said video tape recorder to a recording standby state and turning on said display light emitting element; said control means, when a second video tape cassette which is not provided with said erasure prevention tab has been loaded into said video tape recorder, setting said video tape recorder to a stop state and flashing said display light emitting element.

By the above described arrangement of the VTR of the present invention, the VTR can be automatically set to the recording standby state or playback of the VTR can be performed immediately on the basis of whether or not the video tape cassette loaded into the VTR is provided with the erasure prevention tab.

Furthermore, in accordance with the present invention, it becomes possible to rapidly effect changeover of the VTR between the recording mode and the playback mode.

BRIEF DESCRIPTION OF THE DRAWINGS

These objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
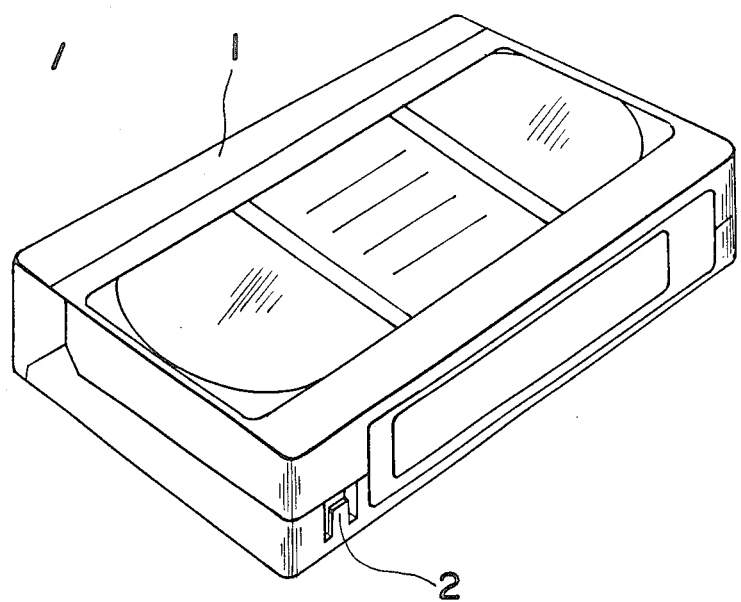
FIG. 1 is a perspective view of a video tape cassette.
Figure 2:
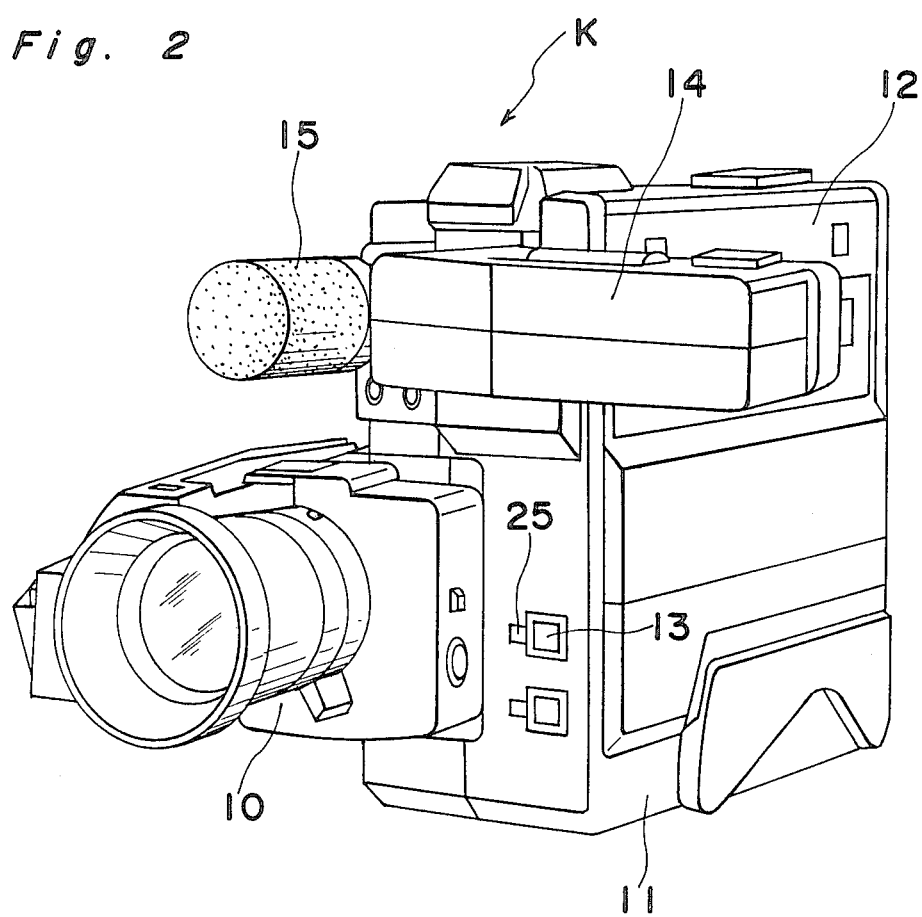
FIGS. 2 and 3 are front and rear perspective views of an integrated video camera/recorder unit according to the present invention, respectively.
Figure 3:
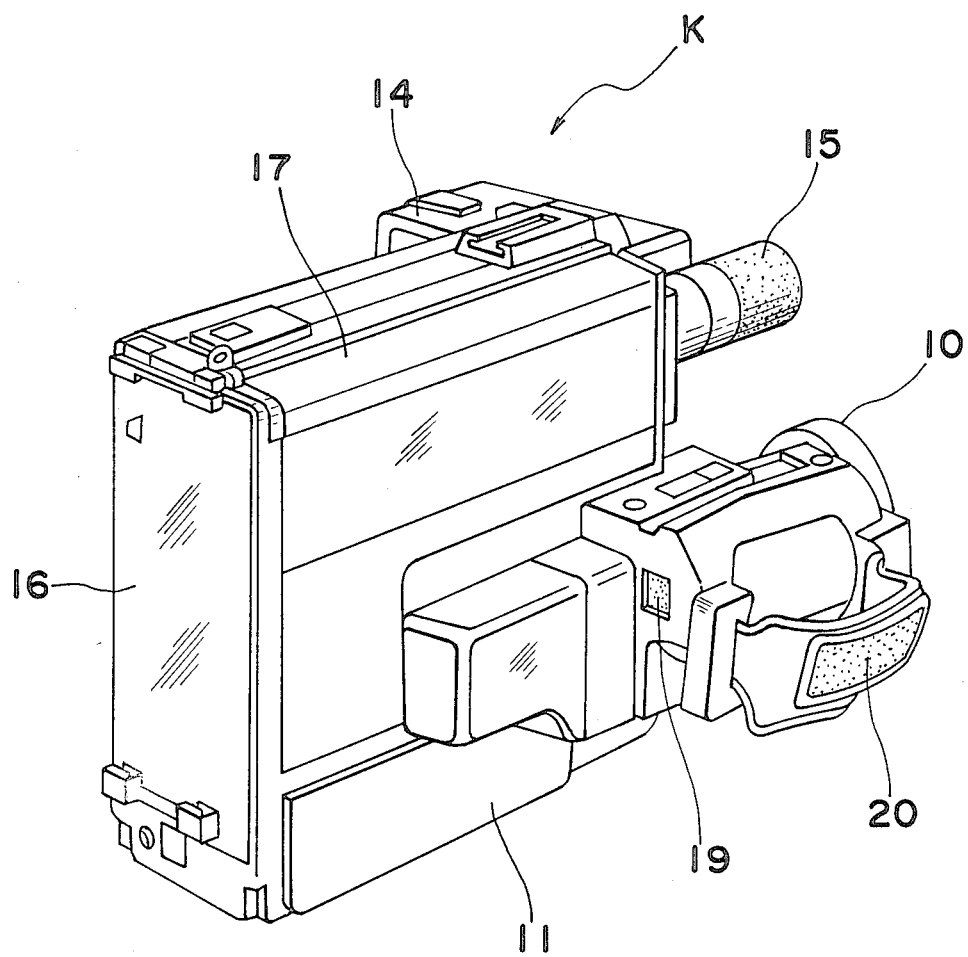

Referring now to the drawings, there is shown in FIGS. 2 and 3, an integrated video camera/recorder unit K according to the present invention, in which a video camera section 10 for converting an image of an object into video signals and a video tape recorder (VTR) section 11 for recording onto the magnetic tape of the video tape cassette 1 (FIG. 1) the video signals delivered from the video camera section 10 are integrally combined with each other. The unit K further includes a cassette holder 12 for loading the video tape cassette 1 thereinto, an electronic viewfinder 14, a microphone 15, a battery mounting portion 16 for mounting a battery pack thereon, and a pivotal protective cover 17 for covering a mode changeover operating portion. When a cassette ejection button (not shown) has been depressed after turning on of a power source switch 13 of the unit K, the cassette holder 12 is displaced in parallel with a side face of the VTR section 11 so as to be opened. Meanwhile, when the protective cover 17 has been pivoted so as to uncover the mode changeover operating portion, the mode changeover operating portion is exposed outwardly.

Figure 4:
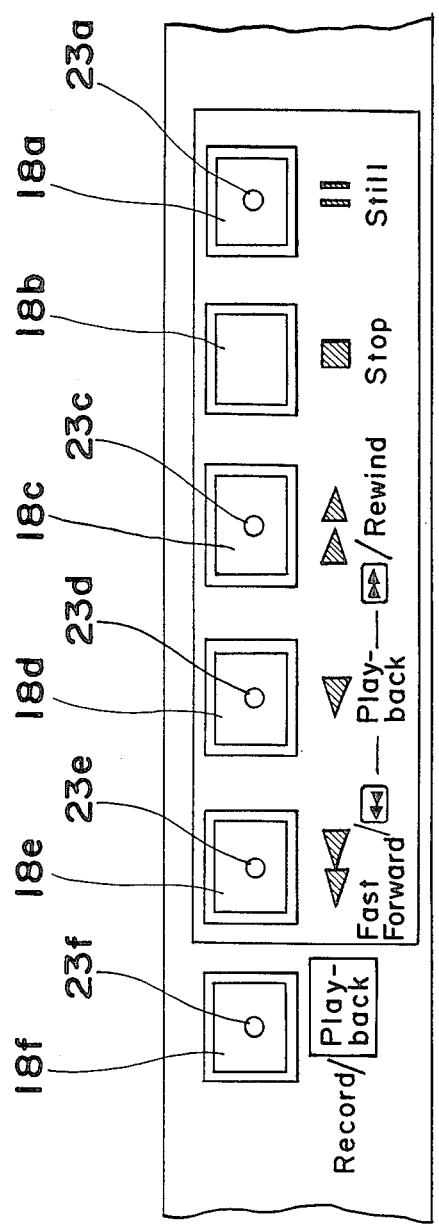
FIG. 4 is a top plan view of a mode changeover operating portion employed in the unit of FIG. 2.

As shown in FIG. 4, the mode changeover operating portion includes a Still button (Still Picture Playback button) 18a, a Stop button 18b, a Rewind/Rewind Playback button 18c, a Playback button 18d, a Fast Forward/Fast Forward Playback button 18e, and a Record/Playback button 18f. In the mode changeover operating portion, the symbol "slash (/)" indicates "or". Namely, for example, "Rewind/Rewind Playback" means rewinding or rewinding playback. Accordingly, when the Rewind/Rewind Playback button 18c is depressed after depression of the Stop button 18b, the magnetic tape of the video tape cassette 1 is rewound. Meanwhile, when the Rewind/Rewind Playback button 18c is depressed after playback of the magnetic tape of the video tape cassette 1, rewinding playback of the magnetic tape of the video tape cassette 1 is performed.

The Record/Playback button 18f is effectively actuated when the video tape cassette 1 having the erasure prevention tab 2 as shown in FIG. 1 has been loaded into the VTR section 11 by inserting the video tape cassette 1 into the cassette holder 12. If the Record/Playback button 18f is depressed when the VTR section 11 is in a recording standby state, the VTR section 11 is changed over to a playback mode so as to be in a still picture playback state. Meanwhile, on the contrary, if the Record/Playback button 18f is depressed when the VTR section 11 is in a playback state, a stop state, a rewinding state or a fast forwarding state, the VTR section 11 is set to the recording standby state.

Moreover, the unit K includes a Record Start/Stop button 19 and a grip belt 20 as shown in FIG. 3. The Record Start/Stop button 19 is provided adjacent to the grip belt 20 so as to be operated by a thumb of a right hand of the user.

Figure 5:
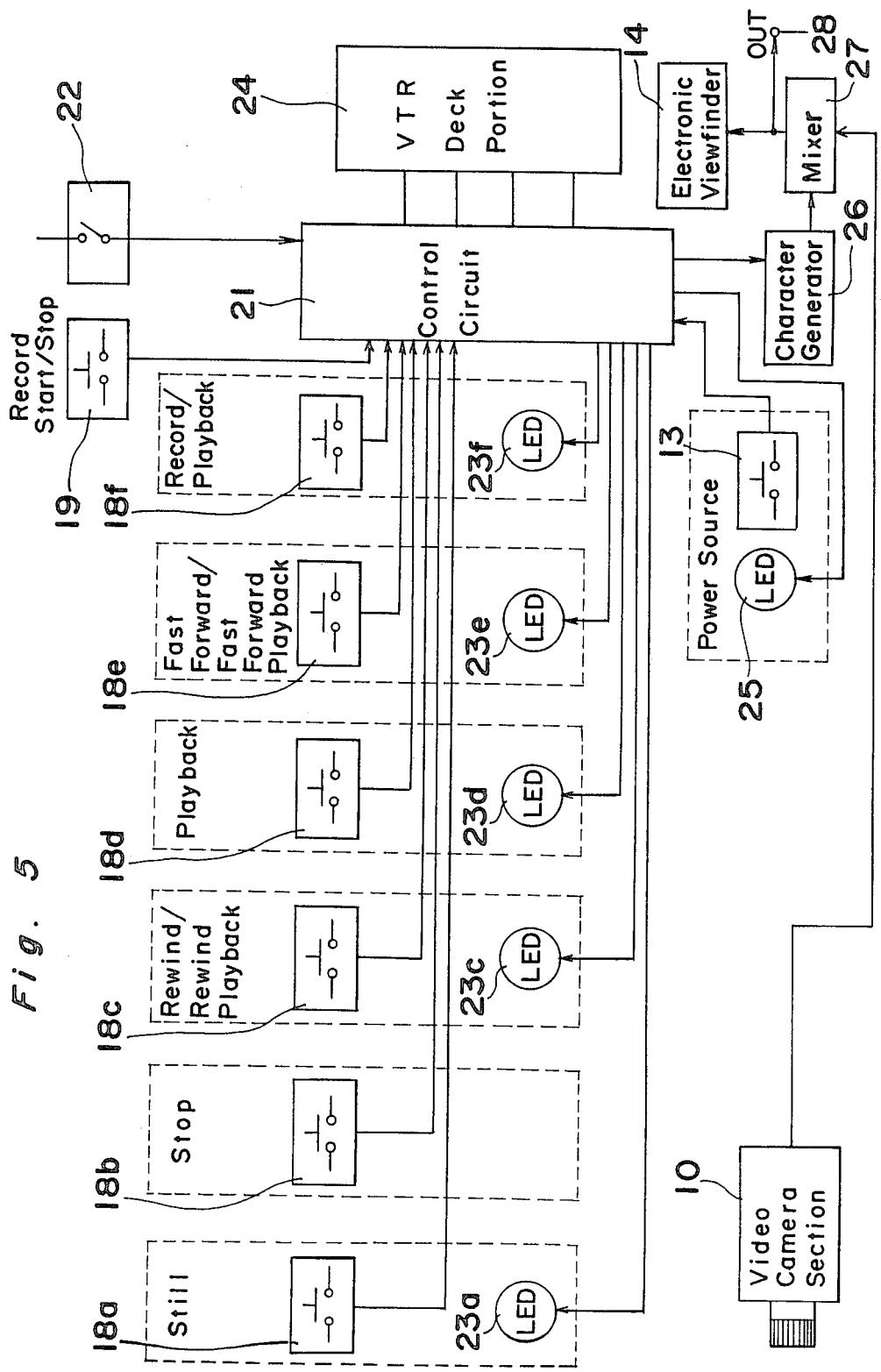
FIG. 5 is an electrical block diagram of a main portion of an electrical circuit employed in the unit of FIG. 2.

As shown in FIG. 5, "on" signals of the buttons 18a–18f and 19 are delivered to a control circuit 21 constituted by, for example, a microcomputer. The control circuit 21 locates a depressed one of the buttons 18a–18f and 19 and stores its location in the case where the mode of the depressed one of the buttons 18a–18f and 19 is held. Furthermore, a detection switch 22 for detecting presence and absence of the erasure prevention tab 2 of the video tape cassette 1, which is constituted by, for example, a microswitch, transmits signals to the control circuit 21 so as to make a decision as to whether or not the video tape cassette 1 is provided with the erasure prevention tab 2. On the basis of the decision of the detection switch 22, the VTR section 11 is set to one of the above described modes. Meanwhile, light emitting diodes (LEDs) 23a, 23c, 23d, 23e and 23f are embedded in central portions of the buttons 18a, 18c, 18d, 18e and 18f, respectively. Signals for turning on the LEDs 23a and 23c–23f are also outputted from the control circuit 21. Thus, when one of the buttons 18a and 18c–18f is depressed and then, a mode corresponding to the depressed one of the buttons 18a and 18c–18f is held, the corresponding LED is turned on. Meanwhile, an LED is not provided at the Stop button 18b in this embodiment of the present invention in order to indicate that the VTR section 11 is in the stop state when all the LEDs are turned off. The control circuit 21 also controls a deck portion 24 of the VTR section 11 so as to set the VTR section 11 to a desired one of the modes.

Hereinbelow, operation and actuation of the unit K will be described. Initially, the cassette holder 12 is opened and then, the video tape cassette 1 is inserted into the cassette holder 12. By depressing the cassette holder 12 into the VTR section 11 with a hand of the user, the video tape cassette 1 has been loaded into the VTR section 11. At this time, the detection switch 22 detects kinds of the video tape cassette 1, i.e., presence and absence of the erasure prevention tab 2 of the video tape cassette 1. For example, in the case where the video tape cassette 1 is provided with the erasure prevention tab 2 as shown in FIG. 1, an actuator of the detection switch 22 is brought into contact with the erasure prevention tab 2 and thus, the detection switch 22 is turned on. Meanwhile, in the case where the video tape cassette 1 is not provided with the erasure prevention tab 2, the actuator of the detection switch 22 is inserted into a hole of the video tape cassette 1, which is defined by removal of the erasure prevention tab 2 therefrom and thus, the detection switch 22 is turned off. Accordingly, "on" and "off" signals of the detection switch 22 act as decision signals for determining presence and absence of the erasure prevention tab 2 of the video tape cassette 1, respectively. Since one of the decision signals of the detection switch 22 has been applied to the control circuit 21, the VTR section 11 is set to one of the modes by the decision signals and signals obtained upon operation of the buttons 18a–18f and 19. In addition, output signals are delivered from the control circuit 21 to the LEDs 23a and 23c–23f so as to operate the deck portion 24 of the VTR section 11.

Here, determination of the modes of the VTR section 11 is explained again. Initially, when the power source switch 13 is turned on, electric power is supplied to the video camera section 10 and the VTR section 11 and an LED 25 for indicating supply of electric power to the unit K is turned on. At this time, if the video tape cassette 1 is not loaded into the VTR section 11, the VTR section 11 is not actuated, namely, the VTR section 11 is held in the stop state. Then, when the video tape cassette 1 is loaded into the VTR section 11 as described above, the unit K is actuated as follows.

Firstly, when the video tape cassette 1 provided with the erasure prevention tab 2 is loaded into the VTR section 11 (in the case of a rotary head cylinder type VTR, the magnetic tape is loaded onto the cylinder of the rotary head so as to be in a temporary stop state), the VTR section 11 is immediately set to the recording standby state and the LED 23f for indicating recording is turned on. In order to start recording from this state, the Record Start/Stop button 19 is depressed and thus, the magnetic tape is caused to run such that an image of an object taken by the video camera section 10 is recorded, as video signals, onto the magnetic tape. In order to stop the recording at this time, the Record Start/Stop button 19 is depressed again, so that the VTR section 11 is set to the temporary stop state. Thereafter, in order to resume recording, the Record Start/Stop button 19 is depressed.

In the case where playback is performed after recording has been completed as described above, the VTR section 11 is set to the temporary stop state (standby state) and then, the Record/Playback button 18f is depressed. Thus, the VTR section 11 is set to the still playback state, while the LED 23a for indicating display of a still picture and the LED 23d for indicating playback are turned on.

Then, in the case where the user wishes to view a portion recorded so far, the Rewind/Rewind Playback Button 18c is depressed when the VTR section 11 is in the playback state, so that the VTR section 11 is set to the rewinding playback state and thus, the recorded portion of the magnetic tape is played back while the magnetic tape is being rewound.

Meanwhile, when the Rewind/Rewind Playback button 18c is depressed after the VTR section 11 has been set to the stop state from the still picture playback state upon depression of the Stop button 18b, the VTR section 11 is set to the rewinding state. Then, when the VTR section 11 is set to the playback state after the magnetic tape has been rewound up to a desired position by viewing a tape counter, etc., it becomes also possible to play back the recorded portion of the magnetic tape.

On the other hand, when the video tape cassette 1 which is not provided with the erasure prevention tab 2, i.e., the recorded video tape cassette 1 is loaded into the VTR section 11, the VTR section 11 is actuated as follows. Namely, since information that the video tape cassette 1 is not provided with the erasure prevention tab 2 is obtained by the detection switch 22 as described above, the VTR section 11 judges that it is not necessary to perform recording any more. Therefore, since the VTR section 11 is not set to the recording standby state, the VTR section 11 informs initially the user that the video tape cassette 1 loaded into the VTR section 11 is a commercially available prerecorded video tape cassette or a video tape cassette disabling recording regardless of whether or not the user is aware of this fact. In order to give the user a warning, the LED 23f for indicating recording, for example, is flashed by repeatedly turning on and off the LED 23f for 0.5 sec., respectively alternately. The integrated video camera/recorder unit K is provided with the electronic viewfinder 14 for monitoring an image of an object being taken by the video camera section 10. Thus, if warning characters generated by a character generator 26, for example, "TAPE" are displayed on a screen of the electronic viewfinder 14, the user becomes aware immediately that the video tape cassette 1 loaded into the VTR section 11 is a commercially available prerecorded video tape cassette or a recorded video tape cassette, which is fairly convenient for the user. Accordingly, buttons which can be operated subsequently by the user are restricted to the buttons 18a, 18b and 18c. Thus, even if the Record/Playback button 18f and the Record Start/Stop button 19 are depressed, the buttons 18f and 19 are not actuated. It is needless to say that in the case where one of the video tape cassettes 1 which is provided with and is not provided with the erasure prevention tab 2, respectively has been loaded into the VTR section 11 when the power source switch 13 is not turned on, the VTR section 11 is set to the above described modes after turning on of the power source switch 13. Meanwhile, in FIG. 5, reference numerals 27 and 28 represent a mixer and an output terminal, respectively.

As is clear from the foregoing description, in the VTR of the present invention, when the video tape cassette provided with the erasure prevention tab has been loaded into the VTR, the VTR is automatically set to the recording standby state and the light emitting element for indicating recording is turned on. Meanwhile, when the video tape cassette which is not provided with the erasure prevention tab has been loaded into the VTR, the VTR is not set to the recording standby state and the light emitting element for indicating recording is flashed.

Accordingly, in accordance with the present invention, the VTR can be operated remarkably efficiently and easily.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A video tape recorder comprising:
   a detection means for detecting presence and absence of an erasure prevention tab of a video tape cassette loaded into said video tape recorder;
   a display light emitting element;
   a control means which is operatively associated with said detection means;
   said control means, when a first video tape cassette which is provided with said erasure prevention tab has been loaded into said video tape recorder, automatically setting said video tape recorder to a recording standby state and turning on said display light emitting element; and
   means for starting and pausing tape transportation during a recording mode after said video tape recorder has been set to said recording standby state,
   said control means, when a second video tape cassette which is not provided with said erasure prevention tab has been loaded into said video tape recorder, setting said video tape recorder to a stop state and flashing said display light emitting element.

2. A video tape recorder as claimed in claim 1, further comprising:
   a push-button switch for changing over said video tape recorder to a recording mode or a playback mode, whereby when said first video tape cassette which is provided with said erasure prevention tab has been loaded into said video tape recorder, said video tape recorder is changed over to the recording mode or the playback mode by actuating said push-button switch.

3. A video tape recorder as claimed in claim 1, wherein said display light emitting element acts also as a light emitting element for indicating the recording mode.

4. A video tape recorder and video camera and character generator combination comprising:
   a detection means for detecting presence and absence of an erasure prevention tab of a video tape cassette loaded into said video tape recorder;

a display light emitting element;

a control means which is operatively associate with said detection means;

said control means, when a first video tape cassette which is provided with said erasure prevention tab has been loaded into said video tape recorder, automatically setting said video tape recorder to a recording standby state and turning on said display light emitting element; and means for starting and pausing tape transportation during a recording mode after said video tape recorder has been set to said recording standby state, said control means, when a second video tape cassette which is not provided with said erasure prevention tab has been loaded into said video tape recorder, setting said video tape recorder to a stop state and flashing said display light emitting element;

further comprising:

a video camera which is integrally combined with said video tape recorder and includes an electronic viewfinder for monitoring an image of an object taken by said video camera; and a character generator for generating warning characters as a video signal, wherein when said second video tape cassette which is not provided with said erasure prevention tab has been loaded into said video tape recorder, said warning characters generated by said character generator are displayed on a screen of said electronic viewfinder so as to indicate that said second video tape cassette has been loaded into said video tape recorder.

* * * * *